US012811021B2

(12) United States Patent
Johnson et al.

(10) Patent No.: US 12,811,021 B2
(45) **Date of Patent: *Nov. 24, 2026**

(54) METHODS AND SYSTEMS FOR SLUICING RADIONUCLIDES FROM RESIN PACKED COLUMNS

(71) Applicant: SHINE Technologies, LLC, Janesville, WI (US)

(72) Inventors: Mark Johnson, Janesville, WI (US); Abdul Momen, Janesville, WI (US); Marek Piechowicz, Beloit, WI (US); Riley McSweeny, Milton, WI (US)

(73) Assignee: SHINE Technologies, LLC, Janesville, WI (US)

( * ) Notice: Subject to any disclaimer, the term of this patent is extended or adjusted under 35 U.S.C. 154(b) by 792 days.

This patent is subject to a terminal disclaimer.

(21) Appl. No.: 18/115,599

(22) Filed: Feb. 28, 2023

(65) Prior Publication Data

US 2024/0290513 A1 Aug. 29, 2024

(51) Int. Cl.
*G21F 9/12* (2006.01)
*B01D 15/18* (2006.01)
(Continued)

(52) U.S. Cl.
CPC ........... *G21F 9/12* (2013.01); *B01D 15/1871* (2013.01); *B01D 15/203* (2013.01); *B01D 15/362* (2013.01); *B01D 15/363* (2013.01)

(58) Field of Classification Search
None
See application file for complete search history.

(56) References Cited

U.S. PATENT DOCUMENTS 2,932,552 A 4/1960 Weiss et al.
3,777,004 A 12/1973 Lankenau et al.
(Continued)

FOREIGN PATENT DOCUMENTS

RU 2560095 C2 8/2015

OTHER PUBLICATIONS

International Search Report and Written Opinion dated Sep. 27, 2024, pertaining to Int'l Patent Application No. PCT/US2024/017488, 9 pgs.
(Continued)

*Primary Examiner* — John J Figueroa
(74) *Attorney, Agent, or Firm* — Dinsmore & Shohl LLP

(57) ABSTRACT

A method of radionuclide waste extraction includes directing a waste stream from an upstream segment of a main waste pathway into a waste stream input of an anion exchange column, wherein the waste stream comprises uranium and a target radionuclide, the anion exchange column houses an anion exchange resin, a cation exchange column housing a cation exchange resin is fluidly coupled to the anion exchange column downstream the anion exchange column, and a sluicing preparation tank is fluidly coupled to the anion exchange column. The method further includes adsorbing uranium from the waste stream onto an anion exchange resin, directing the waste stream from the anion exchange column into the cation exchange column, adsorbing the radionuclide onto the cation exchange resin, removing spent anion exchange resin from the anion exchange column, and directing fresh anion exchange resin from the sluicing preparation tank into the anion exchange column.

13 Claims, 5 Drawing Sheets

(51) Int. Cl.
*B01D 15/20* (2006.01)
*B01D 15/36* (2006.01)

(56) References Cited

U.S. PATENT DOCUMENTS

| | | | | |
|---|---|---|---|---|
| 4,333,847 | A * | 6/1982 | Tran | C03C 1/002 250/493.1 |
| 4,544,499 | A * | 10/1985 | Tran | G21F 9/305 588/12 |
| 4,952,339 | A | 8/1990 | Temus et al. | |
| 5,954,937 | A * | 9/1999 | Farmer | B01J 49/30 205/753 |
| 8,148,594 | B2 | 4/2012 | Denton et al. | |
| 9,208,915 | B2 | 12/2015 | Hussey et al. | |
| 10,106,439 | B2 | 10/2018 | Denton et al. | |
| 10,290,384 | B2 | 5/2019 | Campbell et al. | |
| 10,573,423 | B2 | 2/2020 | Poole et al. | |
| 10,668,405 | B2 | 6/2020 | Denton et al. | |
| 10,717,660 | B2 | 7/2020 | Barker et al. | |
| 12,567,510 | B2 * | 3/2026 | Momen | B01D 15/362 |
| 2012/0071647 | A1 | 3/2012 | Lade et al. | |
| 2012/0305458 | A1 | 12/2012 | Jensen et al. | |
| 2017/0050865 | A1 | 2/2017 | Denton et al. | |
| 2018/0308597 | A1 * | 10/2018 | Strohmer | G21F 9/307 |
| 2019/0001237 | A1 | 1/2019 | Collins et al. | |
| 2021/0225543 | A1 | 7/2021 | Sempere Belda et al. | |
| 2022/0044835 | A1 * | 2/2022 | Guerin | A61K 51/083 |

OTHER PUBLICATIONS

Walker, Jr. et al., "Cesium Removal Demonstration Utilizing Crystalline Silicotitanate Sorbent for Processing Melton Valley Storage Tank Supernate: Final Report," Oak Ridge National Laboratory, ORNL/TM-13503, under U.S. Department of Energy contract DE-AC05-96OR22464, published Mar. 1998.

Wester et al., "Pilot-Scale Test of Counter-Current Ion Exchange (CCIX) Using UOP IONSIV IE-911," Pacific Northwest National Laboratory, PNNL-13625, under U.S. Department of Energy contract DE-AC06-76RL01830 published Sep. 2001.

* cited by examiner

METHODS AND SYSTEMS FOR SLUICING RADIONUCLIDES FROM RESIN PACKED COLUMNS

STATEMENT REGARDING FEDERALLY SPONSORED RESEARCH AND DEVELOPMENT

The present disclosure was developed with Government support under Contract No. DE-NA0004010 awarded by the United States Department of Energy. The Government has certain rights in the present disclosure.

TECHNOLOGY

The present disclosure relates generally to systems and methods for extracting waste radionuclides, for example, waste radionuclides generated in a medical isotope production process.

BACKGROUND

Current techniques for nuclear waste separation include solvent-based extraction, often referred to as solvent extraction or liquid-liquid extraction. Solvent extraction is a separation technique in which an extractant containing organic phase is contacted with a metal-ion containing aqueous phase. Upon mixing, the metal ion is transferred from the aqueous phase into the organic phase. Despite industry reliance, solvent extraction exhibits many drawbacks including challenges associated with phase disengagement, formation of heavy or "third" phases, and the generation of large volumes of hazardous organic waste. Process reliance on hazardous aromatic organic solvents presents a particular challenge from an environmental stewardship standpoint. Many commercial waste haulers have low tolerance for the presence of benzene or other aromatic hydrocarbons in solidified waste.

Accordingly, a need exists for improved methods and systems for nuclear waste separation, for example, in a medical isotope production process.

SUMMARY

According to a first aspect of the present disclosure, a method of radionuclide waste extraction includes directing a waste stream from an upstream segment of a main waste pathway into a waste stream input of an anion exchange column, wherein the waste stream comprises uranium and one or more target radionuclides, the anion exchange column houses an anion exchange resin, a cation exchange column housing a cation exchange resin is fluidly coupled to the anion exchange column along the main waste pathway and positioned downstream the anion exchange column, and a sluicing preparation tank is fluidly coupled to the anion exchange column. The method further includes adsorbing uranium from the waste stream onto an anion exchange resin housed in the anion exchange column, directing the waste stream from the anion exchange column into the cation exchange column, adsorbing one or more target radionuclides onto a cation exchange resin housed in the cation exchange column, removing spent anion exchange resin from the anion exchange column, and directing fresh anion exchange resin from the sluicing preparation tank into the anion exchange column.

A second aspect includes the method of the first aspect, wherein the one or more target radionuclides comprise strontium-90 and cesium-137.

A third aspect includes the method of the first aspect or the second aspect, wherein the anion exchange resin comprises an initial adsorption capacity and the spent anion exchange resin comprises an adsorption capacity of 85% or less of the initial adsorption capacity.

A fourth aspect includes the method of any of the previous aspects, further comprising directing the waste stream from the cation exchange column to a column effluent tank, wherein the waste stream entering the column effluent tank comprises less than 0.04 curies per cubic meter of strontium-90 and less than 1 curie per cubic meter of cesium-137.

A fifth aspect includes the method of any of the previous aspects, further comprising, prior to removing spent anion exchange resin, directing elution acid into the anion exchange column to desorb uranium from the anion exchange resin in a first elution acid wash, forming a uranium waste stream and after the first elution acid wash, directing the waste stream from the upstream segment of the main waste pathway into the anion exchange column and adsorbing uranium onto the anion exchange resin.

A sixth aspect includes the method of the fifth aspect, further comprising directing the uranium waste stream from the anion exchange column to a column effluent tank along a strip waste pathway, wherein the strip waste pathway extends from the anion exchange column to the column effluent tank bypassing the cation exchange column.

A seventh aspect includes the method of the fifth aspect, further comprising directing the uranium waste stream from the anion exchange column to a secondary collection tank along a strip pathway and directing the waste stream from the cation exchange column to a column effluent tank.

The eighth aspect includes the method of any of the fifth through seventh aspects, further comprising, after the first elution acid wash and prior to removing the spent anion exchange resin, directing the elution acid into the anion exchange column to desorb uranium from the anion exchange resin in a second elution acid wash and after the second elution acid wash, directing the waste stream from the upstream segment of the main waste pathway into the anion exchange column and adsorbing uranium onto the anion exchange resin.

The ninth aspect includes the method of any of the fifth through eighth aspects, further comprising, performing at least three elution acid washes prior to removing the spent anion exchange resin and directing fresh anion exchange resin from the sluicing preparation tank into the anion exchange column.

The tenth aspect includes the method of any of the previous aspects, wherein removing spent anion exchange resin from the anion exchange column comprises ceasing flow of the waste stream from the upstream segment of the main waste pathway into the waste stream input of the anion exchange column and directing spent anion exchange resin from the anion exchange column into a spent resin tank, and directing fresh anion exchange resin from the sluicing preparation tank into the anion exchange column occurs while flow of the waste stream from the upstream segment of the main waste pathway is ceased and after directing fresh anion exchange re sin from the sluicing preparation tank into the anion exchange column, the method further comprises resuming flow of the waste stream from the upstream segment of the main waste pathway into the waste stream input of the anion exchange column.

The eleventh aspect includes the method of any of the previous aspects, wherein the sluicing preparation tank is fluidly coupled to the cation exchange column and the method further comprises removing spent cation exchange resin from the cation exchange column and directing fresh cation exchange resin from the sluicing preparation tank into the anion exchange column.

The twelfth aspect includes the method of any of the first through tenth aspects, wherein the sluicing preparation tank is a first sluicing preparation tank, and the method further comprises removing spent cation exchange resin from the cation exchange column and directing fresh cation exchange resin from a second sluicing preparation tank into the cation exchange column.

The thirteenth aspect includes the method of any of the previous aspects, wherein the waste stream in the upstream segment of the main waste pathway comprises 1 gram/liter of uranium or greater and the waste stream in the upstream segment of the main waste pathway comprises a gram/liter level of uranium that is at least 500 times greater than a gram/liter level of both strontium-90 and cesium-137.

According to a fourteenth aspect of the present disclosure, a waste extraction system includes an anion exchange column housing an anion exchange resin and fluidly coupled to an upstream segment of a main waste pathway, a cation exchange column housing a cation exchange resin and fluidly coupled to the anion exchange column along the main waste pathway, wherein the anion exchange column is upstream the cation exchange column, a column effluent tank positioned downstream the anion exchange column and the cation exchange column, a sluicing preparation tank fluidly coupled to the anion exchange column, and a radiation shielding system positioned between the sluicing preparation tank and both the anion exchange column and the cation exchange column, wherein the radiation shielding system forms a radiation barrier between the sluicing preparation tank and both the anion exchange column and the cation exchange column.

The fifteenth aspect includes the waste extraction system of the fourteenth aspect, wherein the sluicing preparation tank is fluidly coupled to the anion exchange column by an anion exchange resin input pathway and the sluicing preparation tank is fluidly coupled to the cation exchange column by a cation exchange resin input pathway.

The sixteenth aspect includes the waste extraction system of the fourteenth aspect, wherein the sluicing preparation tank is a first sluicing preparation tank and the waste extraction system comprises a second sluicing preparation tank fluidly coupled to the cation exchange column, wherein the first sluicing preparation tank houses fresh anion exchange resin and the second sluicing preparation tank houses fresh cation exchange resin.

The seventeenth aspect includes the waste extraction system of any of the fourteenth through sixteenth aspects, further comprising an elution acid source fluidly coupled to the anion exchange column.

The eighteenth aspect includes the waste extraction system of the seventeenth aspect, wherein the anion exchange column comprises a waste stream input and an elution input each located at a first end of the anion exchange column, wherein the waste stream input is fluidly coupled to the upstream segment of the main waste pathway and the elution input is fluidly coupled to the elution acid source and a waste stream output and an elution output each located at a second end of the anion exchange column, wherein the elution output is fluidly coupled to a strip waste pathway and the waste stream output is fluidly coupled to the cation exchange column.

The nineteenth aspect includes the waste extraction system of the eighteenth aspect, wherein the strip waste pathway extends from the anion exchange column to the column effluent tank bypassing the cation exchange column.

The twentieth aspect includes the waste extraction system of the eighteenth aspect, wherein the strip waste pathway extends from the anion exchange column to a secondary collection tank.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
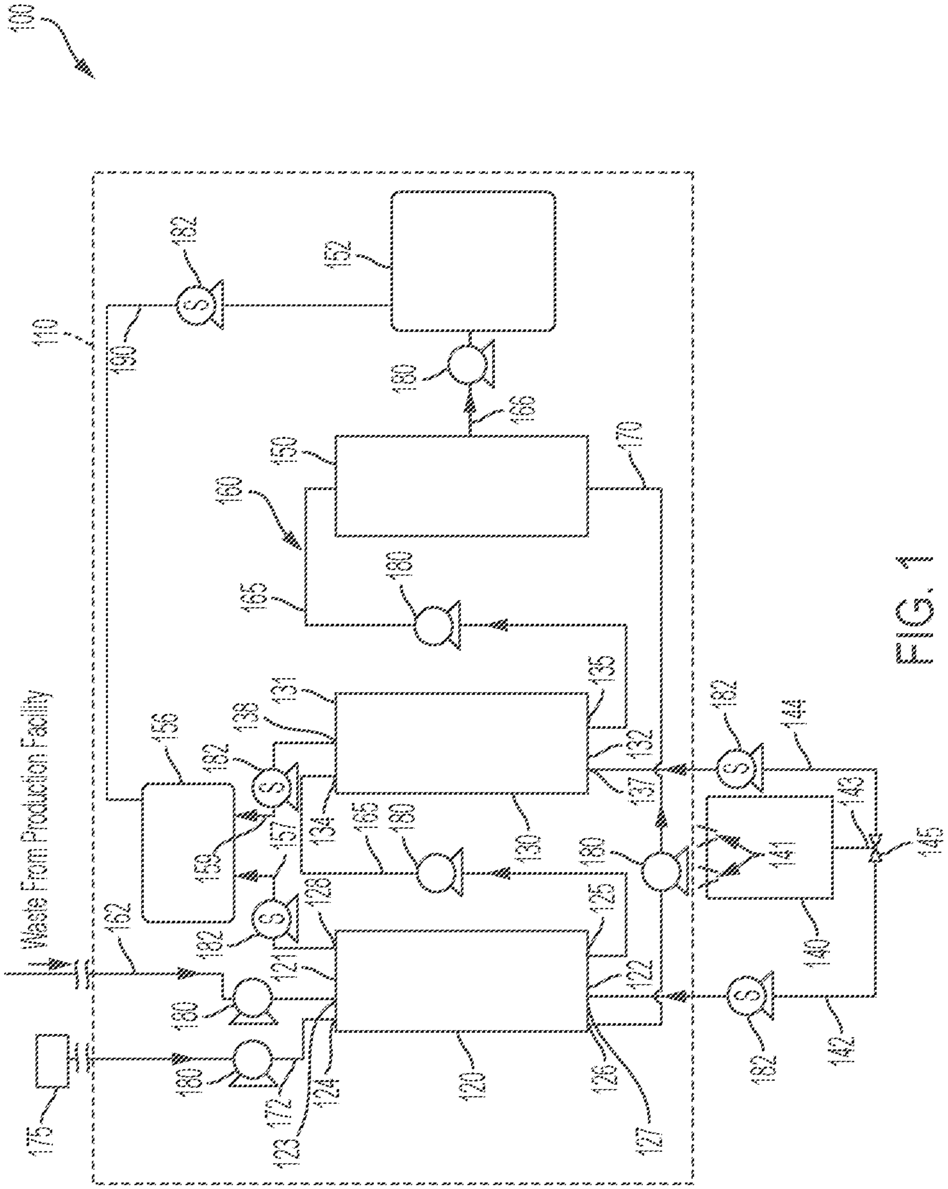
FIG. 1 schematically depicts a waste extraction system comprising a sluicing preparation tank, according to one or more embodiments shown and described herein.

Referring generally to the figures, embodiments of the present disclosure are directed to waste extraction systems and methods for the removal of target waste radionuclides from a waste stream, for example, from a waste stream formed during a medical isotope production process, such as a molybdenum-99 (Mo-99) production process. The waste stream includes multiple radionuclides, such as uranium-235 (U-235), cesium-137 (Cs-137), and strontium-90 (Sr-90). The waste extraction system includes an anion exchange column that houses an anion exchange resin and a cation exchange column that houses a cation exchange resin. The anion and cation exchange columns are fluidly coupled to a main waste pathway such that the waste stream passes through the anion and cation exchange columns and reaches a column effluent tank for final processing.

The anion exchange column is positioned upstream the cation exchange column along the main waste pathway such that the waste stream passes through the anion exchange column before passing through the cation exchange column. The anion exchange resin housed in the anion exchange column is configured to selectively adsorb a primary radionuclide, such as uranium, and the cation exchange resin housed in the cation exchange column is configured to selectively adsorb one or more target radionuclides, such as Cs-137 and Sr-90. The anion exchange column provides a way to remove the primary radionuclide from the waste stream, such that the waste stream that passes through the cation exchange column comprises minimal primary radionuclide. This allows the one or more supporting adsorption columns to remove other target radionuclides from the waste stream, such as Cs-137 and Sr-90, which may be present in lower quantities in the initial waste stream than the primary radionuclide.

During operation, the primary radionuclide is present in higher qualities in the initial waste stream than the other target radionuclides. Thus, the anion exchange resin reaches its maximum adsorption capacity faster than the cation exchange resin. In view of this, the waste extraction system further includes a sluicing preparation tank fluidly coupled to the anion exchange column, facilitating efficient replacement of fresh anion exchange resin into the anion exchange column by sluicing. The waste extraction system also includes a radiation shielding system positioned between the sluicing preparation tank and both the anion exchange column and cation exchange column, allowing the sluicing preparation tank to be reloaded while the waste extraction system is in operation while minimizing radiation exposure at the sluicing preparation tank. Embodiments of the waste extraction system and methods of radionuclide waste extraction using the waste extraction system will now be described and, whenever possible, the same reference numerals will be used throughout the drawings to refer to the same or like parts.

Figure 3:
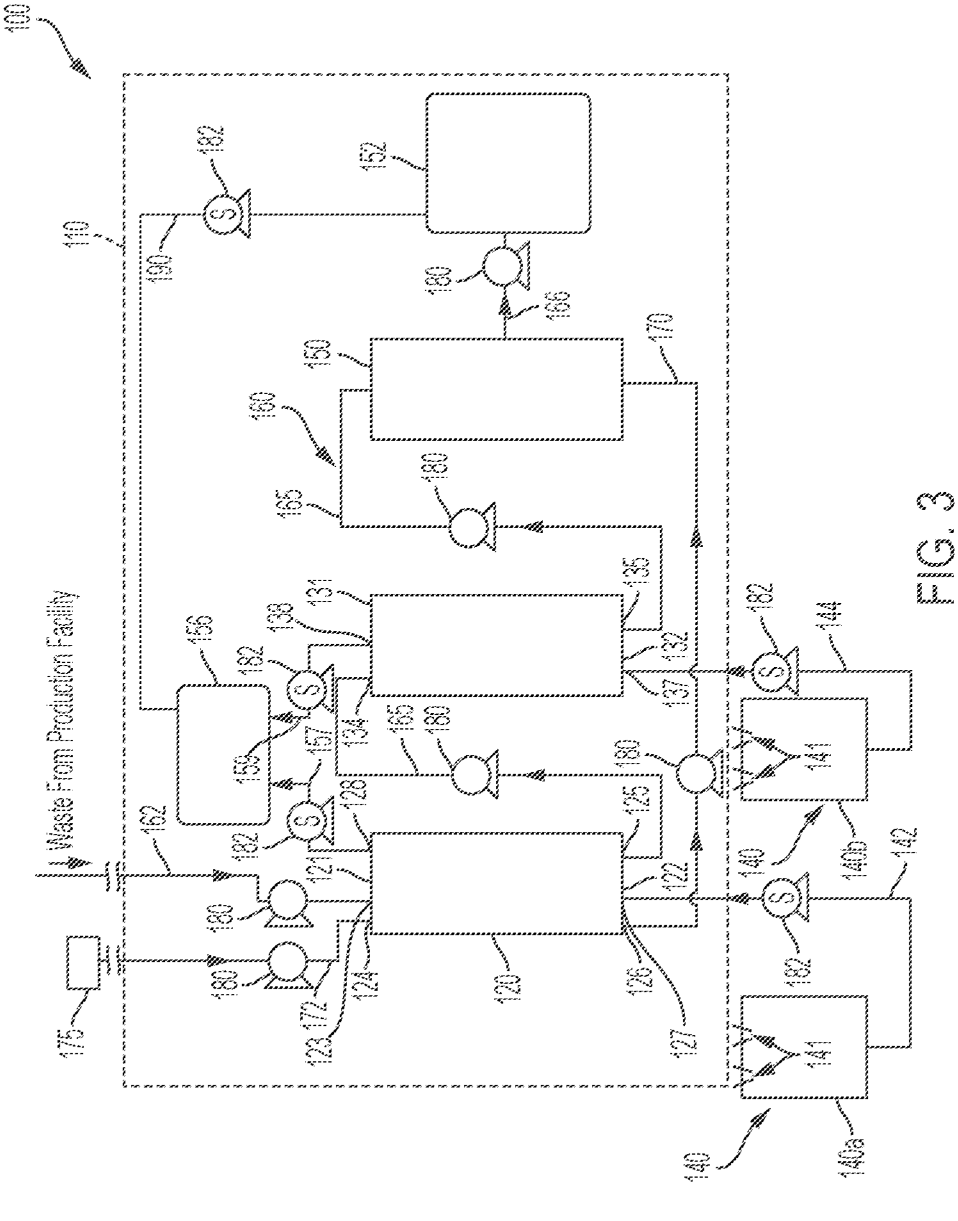
FIG. 3 schematically depicts a waste extraction system comprising two sluicing preparation tanks, according to one or more embodiments shown and described herein.
Figure 4:
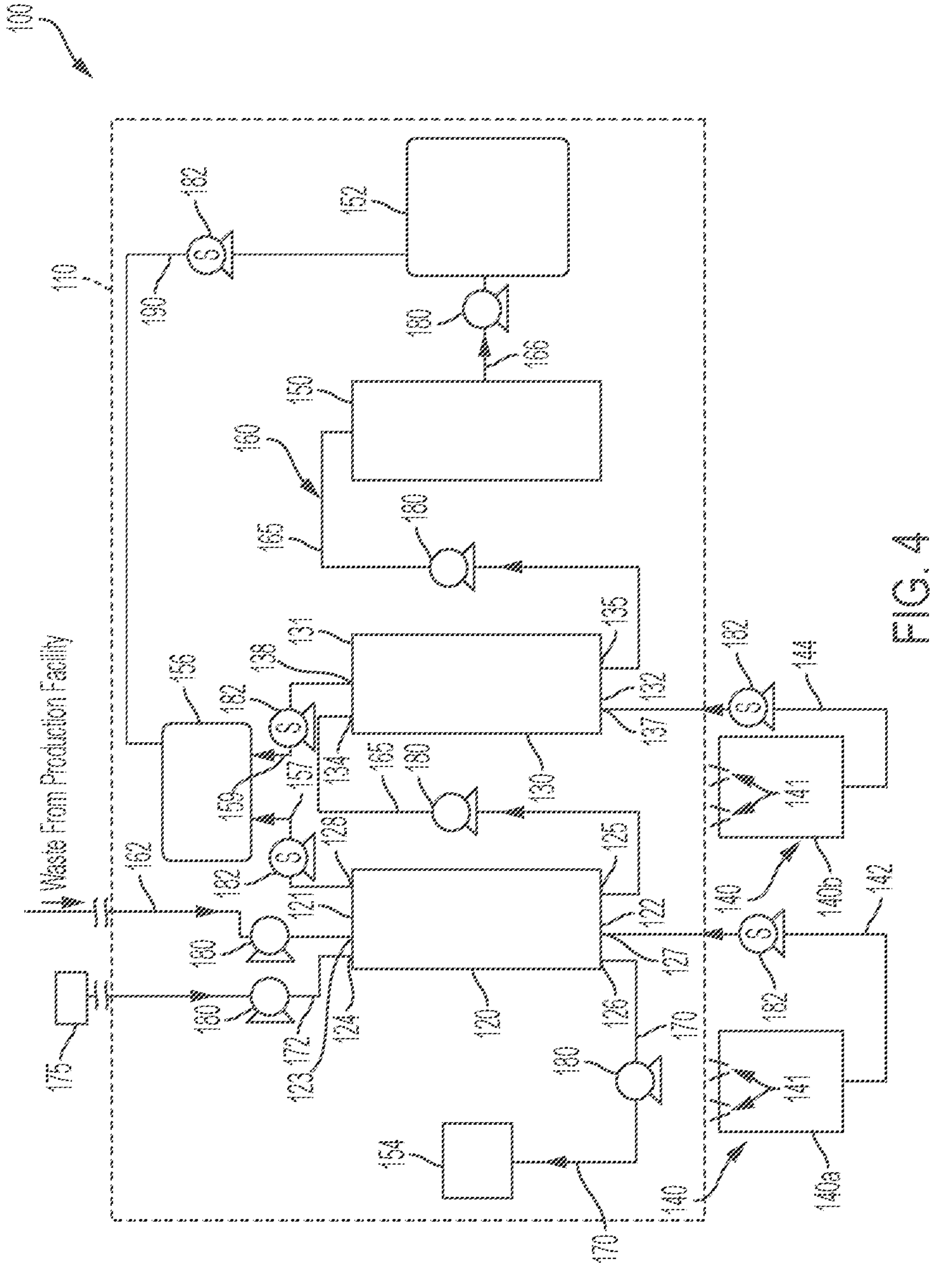
FIG. 4 schematically depicts a waste extraction system comprising two sluicing preparation tanks and a secondary collection tank, according to one or more embodiments shown and described herein.
Figure 5:
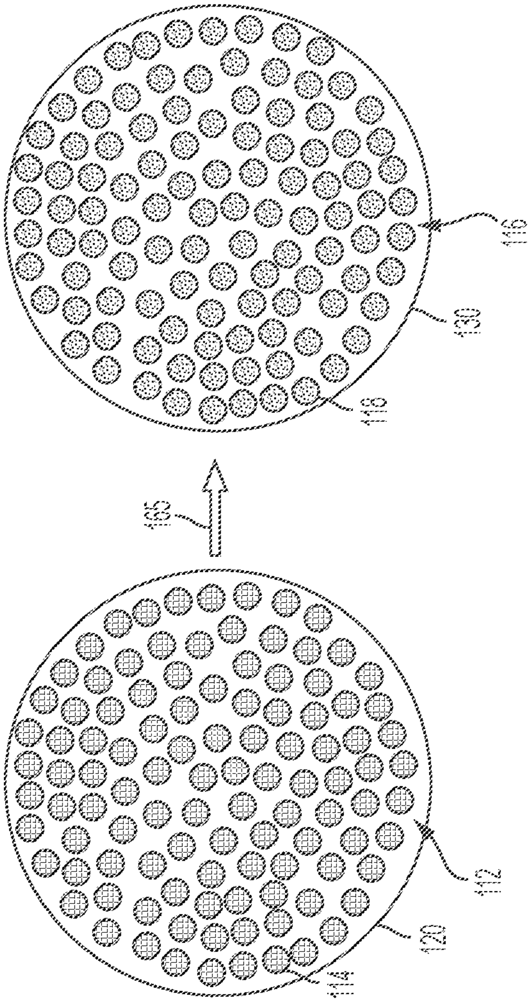
FIG. 5 schematically depicts ion exchange resin housed in an anion exchange column and a cation exchange column of any of the waste extraction systems of FIGS. 1-4, according to one or more embodiments shown and described herein.

Referring now to FIGS. 1-4 a waste extraction system 100 is shown, according to a few illustrative embodiments. The waste extraction system 100 comprises an anion exchange column 120 housing anion exchange resins 112 (FIG. 5) and a cation exchange column 130 housing cation exchange resins 116 (FIG. 5). The anion exchange column 120 and the cation exchange column 130 is fluidly coupled to a main waste pathway 160, which comprises one or more pipes, tubes, or other fluid transport mechanisms for facilitating flow of a waste stream from a production facility, through the anion exchange column 120 and the cation exchange column 130, to a column effluent tank 150, and ultimately to a waste tank 152. One or more pumps 180 are coupled to the main waste pathways 160 to help generate fluid flow within the main waste pathway 160. In one example operation, an upstream segment 162 of the main waste pathway 160 fluidly couples the waste extraction system 100 with a production region of a medical isotope production facility and the waste stream comprises radionuclide waste generated by a medical isotope production process.

The anion exchange column 120 and the cation exchange column 130 are positioned between and fluidly coupled to the upstream segment 162 of the main waste pathway 160 and the column effluent tank 150. In operation, a waste stream comprising radionuclide waste enters the waste extraction system 100 along the upstream segment 162 of the main waste pathway 160 (e.g., an initial waste stream). The anion exchange column 120 is fluidly coupled to the upstream segment 162 of the main waste pathway 160 and positioned upstream the cation exchange column 130 along the main waste pathway 160. In operation, the waste stream traverses the anion exchange column 120 and thereafter traverses the cation exchange column 130 along the main waste pathway 160. In operation, the anion exchange resin 112 housed in the anion exchange column 120 adsorbs a primary radionuclide, such as uranium (e.g., U-235), from the waste stream, reducing the amount of primary radionuclide in the waste stream that enters the cation exchange column 130. The cation exchange resin 116 housed in the cation exchange column 130 then adsorbs one or more target radionuclides from the waste stream, such as Cs-137 and Sr-90.

Figure 2:
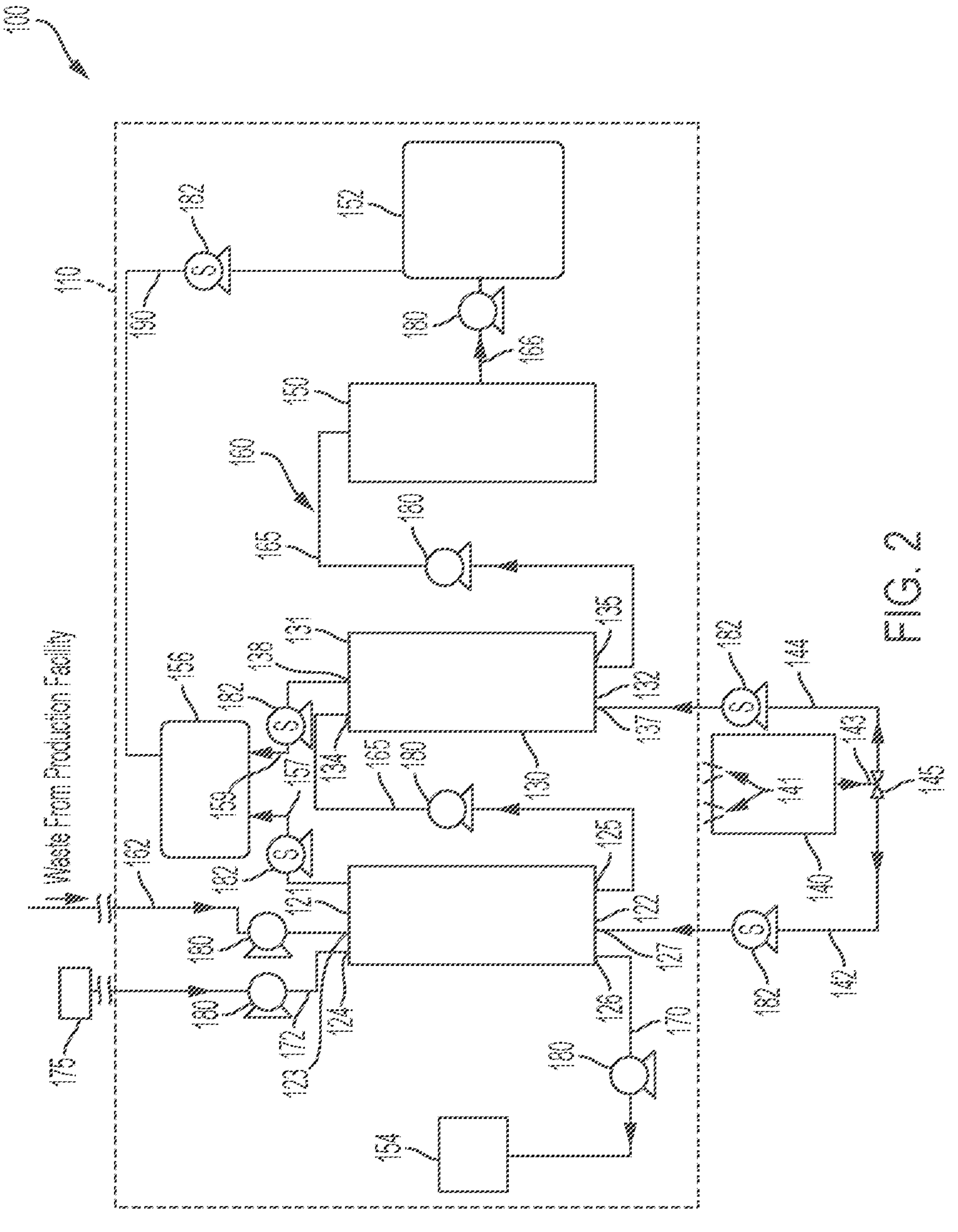
FIG. 2 schematically depicts a waste extraction system comprising a sluicing preparation tank and a secondary collection tank, according to one or more embodiments shown and described herein.

The column effluent tank 150 is fluidly coupled to the main waste pathway 160 and receives a modified waste stream from the cation exchange column 130 (i.e., a waste stream with reduced amounts of Cs-137 and Sr-90). In some embodiments, as depicted in FIGS. 1 and 3, the column effluent tank 150 is also coupled to a strip waste pathway 170, which extends from the anion exchange column 120 to the column effluent tank 150, such that the modified waste stream from the cation exchange column 130 mixes with a primary radionuclide waste stream from the anion exchange column 120 in the column effluent tank 150, as described in more detail below. In other embodiments, as shown in FIGS. 2 and 4, the column effluent tank 150 is fluidly coupled to the main waste pathway 160 and a secondary collection tank 154 is fluidly coupled to the strip waste pathway 170 such that the modified waste stream from the cation exchange column 130 reaches the column effluent tank 150 and the primary radionuclide waste stream from the anion exchange column 120 reaches the secondary collection tank 154.

A waste tank 152 is fluidly coupled to the column effluent tank 150 by a waste tank segment 166 of the main waste pathway 160. Waste in the column effluent tank 150 may be directed into the waste tank 152 along the waste tank segment 166 for final treatment and removal off-site. This final treatment may comprise solidifying the resultant waste with concrete, to form solidified, final waste, which may occur in the waste tank 152. In some embodiments, the column effluent tank 150 and the waste tank 152 are the same volume, for example, a volume in a range of from 25 gallons to 75 gallons, such as 50 gallons. In other embodiments, the column effluent tank 150 and the waste tank 152 are different volumes and may comprise volumes in a range of from 25 gallons to 75 gallons. By removing target radionuclides using the waste extraction system 100, the waste received by the column effluent tank 150 and the waste tank 152 comprises lower levels of radioactivity than the initial waste stream. Indeed, the target radionuclides contribute a disproportionate amount of the total radioactivity in the initial waste stream. For example, Cs-137 is a gamma emitting nuclide and thus, it is desirable to minimize the amount of the Cs-137 in the resultant waste. Adsorbing the target radionuclides, such as Cs-137 and Sr-90, allows these target radionuclides to be disposed separately from the remainder of the waste, for example in a minimized volume that is sealed in concrete.

By removing the primary radionuclide from the waste stream at the anion exchange column 120, the cation exchange column 130 may adsorb other target radionuclides more efficiently and effectively. Without intending to be limited by theory, the primary radionuclide (e.g., uranium) present in the initial waste stream would be adsorbed by the cation exchange resins 116 in the cation exchange column (together with the one or more target radionuclides) and the large relative amount of target radionuclide could cause the cation exchange resin 116 to reach its adsorption limit before removing the desired amounts of the target radionuclides. For example, the initial waste stream may comprise a gram/liter level of uranium that is at least 500 times greater than a gram/liter level of both strontium-90 and cesium-137, for example, at least 750 times greater, at least 1000 times greater, at least 1250 times greater, at least 1500 times greater, at least 2000 times greater, or a multiplier in a range having any two of these values as endpoints. In some embodiments, the initial waste stream may comprise a gram/liter level of uranium that is at least 500 times greater than a gram/liter level of any individual of the following radionuclides, barium, cerium, lanthanum, molybdenum, neodymium, palladium, praseodymium, rubidium, rhodium, ruthenium, samarium, yttrium, and zirconium, for example, at least 750 times greater, at least 1000 times greater, at least 1250 times greater, at least 1500 times greater, at least 2000 times greater, or a multiplier in a range having any two of these values as endpoints. Moreover, uranium may comprise from 40% to 60% of the total radionuclides in the initial waste stream by mass.

In some embodiments, the initial waste stream comprises 1 gram/liter of uranium or greater, such as 1.5 gram/liter, 2 gram/liter or greater, 2.5 gram/liter or greater 3 gram/liter or greater, and values in a range having two of these values as endpoints. While Cs-137 and Sr-90 are referred to as the target radionuclides in the embodiments described herein, other target radionuclides may be present in the waste stream and adsorbed by the cation exchange resin 116. For example, other target radionuclides that may be present in the waste stream and may be adsorbed by the cation exchange resin 116 comprise barium, cerium, cesium, lanthanum, molybdenum, sodium, neodymium, palladium, plutonium, praseodymium, rubidium, rhodium, ruthenium, samarium, strontium, yttrium, zirconium, protactinium, or a combination thereof. Moreover, it should be understood that embodiments are contemplated in which other radionuclides besides uranium are the primary radionuclide.

Referring still to FIGS. 1-4, the anion exchange column 120 comprises a waste stream input 123 and an elution input 124 each located at a first end 121 of the anion exchange column 120 and a waste stream output 125 and an elution output 126 each located at a second end 122 of the anion exchange column 120. The waste stream input 123 is fluidly coupled to the upstream segment 162 of the main waste pathway 160 and the waste stream output 125 is fluidly coupled to an inter-column segment 165 of the main waste pathway 160. In some embodiments, the first end 121 of the anion exchange column 120 is opposite the second end 122 of the anion exchange column 120 and the first end 121 of the anion exchange column 120 is above the second end 122 of the anion exchange column 120. This orientation facilitates gravity assisted flow of the waste stream through the anion exchange column 120. Gravity assisted flow may reduce the pumping pressure and pumping power needed to flow the waste stream through the anion exchange column 120. Gravity assisted flow may also maximize contact between the anion exchange resin 112 and the waste stream, maximizing adsorption of the primary radionuclide. The anion exchange column 120 further comprises a resin input 127 and a resin output 128. The resin input 127 is fluidly coupled to a sluicing preparation tank 140 by an anion exchange resin input pathway 142 (for example, the sluicing preparation tank 140 of FIGS. 1 and 2 or the first sluicing preparation tank 140*a* of FIGS. 3 and 4). The resin output 128 is fluidly coupled to a spent resin tank 156 by an anion exchange resin output pathway 157.

The cation exchange column 130 comprises a waste stream input 134 and a waste stream output 135. The waste stream input 134 is located at the first end 131 of the cation exchange column 130 and the waste stream output 135 is located at the second end 132 of the cation exchange column 130. Moreover, in some embodiments, the first end 131 of the cation exchange column 130 is opposite the second end 132, and the first end 131 of the cation exchange column 130 is above the second end 132. This orientation facilitates gravity assisted flow of the waste stream through the cation exchange column 130. Gravity assisted flow may reduce the pumping pressure and pumping power needed to flow the waste stream through the cation exchange column 130. Gravity assisted flow may also maximize contact between the cation exchange resin 116 and the waste stream, maximizing target radionuclide adsorption. While a single cation exchange column 130 is depicted, it should be understood that additional cation exchange columns could be included to adsorb additional amounts of target radionuclides. For example, while not depicted, a second cation exchange column that is positioned along the main waste pathway 160 between the cation exchange column 130 and the column effluent tank 150 and fluidly coupled to the cation exchange column 130 and the column effluent tank 150 by additional inter-column segments 165 and pumps 180 is contemplated.

In some embodiments, the cation exchange column 130 further comprises a resin input 137 and a resin output 138. The resin input 137 is fluidly coupled to a sluicing preparation tank (for example, the sluicing preparation tank 140 of FIGS. 1 and 2 or the second sluicing preparation tank 140*b* of FIGS. 3 and 4) by a cation exchange resin input pathway 144. The resin output 138 is fluidly coupled to the spent resin tank 156 by a cation exchange resin output pathway 159. While the cation exchange column 130 is coupled to a sluicing preparation tank 140 in the embodiments depicted in FIGS. 1-4, embodiments are contemplated in which only the anion exchange column 120 is coupled to a sluicing preparation tank 140. Indeed, in operation, the anion exchange resin 112 needs to be replaced more often than the cation exchange resin 116. The cation exchange column 130 may be able to operate for a sufficient period of time without the use of a sluicing preparation tank 140.

The spent resin tank 156 may also be fluidly coupled to the waste tank 152 by a resin waste pathway 190, such that spent resin removed from the anion exchange column 120 and cation exchange column 130 may be directed into the waste tank 152, for example, by using a sluice pump 182. The spent resin may be directed into the waste tank 152 along the resin waste pathway 190 for final treatment and removal off-site. This final treatment may comprise solidifying the spent resin separate from or together with the resultant waste with concrete, to form solidified, final waste, which may occur in the waste tank 152.

Referring still to FIGS. 1-4, the elution input 124 of the anion exchange column 120 is fluidly coupled to an elution pathway 172 extending from an elution acid source 175 to the elution input 124. The elution output 126 is fluidly coupled to a strip waste pathway 170. One or more of the pumps 180 may be fluidly coupled to the strip waste pathway 170 to help facilitate fluid flow in the strip waste pathway 170. In operation, an elution acid may be directed into the anion exchange column 120 through the elution input 124. The elution acid flows through the anion exchange column 120 and performs an elution acid wash to desorb the primary radionuclide (e.g., uranium) from the anion exchange resin 112 (FIG. 5), forming a primary radionuclide waste stream (e.g., a uranium waste stream). The primary radionuclide waste stream may be directed from the anion exchange column 120 through the elution output 126, into the strip waste pathway 170, where the uranium waste stream is directed to the column effluent tank 150 (FIGS. 1 and 3) or the secondary collection tank 154 (FIGS. 2 and 4).

In FIGS. 1 and 3, the strip waste pathway 170 extends from the anion exchange column 120 to the column effluent tank 150 and provides a fluid pathway from the anion exchange column 120 to the column effluent tank 150 while bypassing the cation exchange column 130. In other embodiments, as depicted in FIGS. 2 and 4, the strip waste pathway 170 extends from the anion exchange column 120 to a secondary collection tank 154 and provides a fluid pathway for removed primary radionuclide to be flowed to the secondary collection tank 154 for collection and possible reuse. In embodiments in which the waste extraction system 100 is part of a medical isotope production facility, the collected primary radionuclide, such as uranium, may be used to generate additional medical isotopes and thereafter processed by the waste extraction system 100 as part of the waste stream. In each of the embodiments of FIG. 1-4, by flowing through the strip waste pathway 170, the primary radionuclide waste stream bypasses the cation exchange column 130, allowing the cation exchange column 130 to adsorb other target radionuclides that are present in the initial waste stream at lower levels than the primary radionuclide, such as Cs-137 and Sr-90. In other words, the strip waste pathway 170 provides a pathway for primary radionuclide removed from the initial waste stream by the anion exchange column 120 to reach a storage location without traversing the cation exchange column 130.

Referring again to FIGS. 1-4, one or more sluice pumps 182 may be fluidly coupled to the anion exchange resin input pathway 142, the cation exchange resin input pathway 144, the anion exchange resin output pathway 157, and the cation exchange resin output pathway 159 to help facilitate the transfer of fresh resin into the anion exchange column 120 and/or the cation exchange column 130 and facilitate the removal of spent resin from the anion exchange column 120 and/or the cation exchange column 130. The sluice pumps 182 may comprise any pump configured to pump a combination of solids and liquids, such as slurry pumps. Before the waste stream is directed into the anion exchange column 120, the anion exchange resin 112 comprises fresh resin. As used herein, "fresh resin" refers to ion exchange resin (e.g., anion exchange resin or cation exchange resin) comprising at least 95% of its initial adsorption capacity. Indeed, in some embodiments, the "fresh resin" comprises at least 99% of its initial adsorption capacity and may, in some embodiments, comprise 100% of its initial adsorption capacity. After the anion exchange resin 112 adsorbs the primary radionuclide and an elution acid wash is performed, the anion exchange resin 112 does not return to its initial adsorption capacity. After each subsequent elution acid wash, the anion exchange resin 112 returns to a lesser percentage of its initial adsorption capacity than after the previous elution acid wash. After several elution acid washes, the adsorption capacity of is no longer sufficiently effective at adsorbing the primary radionuclide from the waste stream.

In some embodiments, as depicted in FIGS. 1 and 2, the sluicing preparation tank 140 is fluidly coupled to both the anion exchange column 120 and the cation exchange column 130. For example, the sluicing preparation tank 140 is fluidly coupled to the anion exchange column 120 by the anion exchange resin input pathway 142 and is fluidly coupled to the cation exchange column 130 by the cation exchange resin input pathway 144. As depicted, in some embodiments, the anion exchange resin input pathway 142 and the cation exchange resin input pathway 144 are each coupled to the sluicing preparation tank 140 by a shared pathway segment 143. The shared pathway segment 143 is connected to the anion exchange resin input pathway 142 and the cation exchange resin input pathway 144 by a directional valve 145 which selectively directs fresh resin toward either the anion exchange column 120 or the cation exchange column 130. In other embodiments, the anion exchange resin input pathway 142 and the cation exchange resin input pathway 144 are each directly coupled to sluicing preparation tank 140. The sluicing preparation tank 140 may be selectively filled with fresh anion exchange resin 112 or fresh cation exchange resin 116. In operation, after fresh resin is directed from the sluicing preparation tank 140 to one of the anion exchange column 120 or the cation exchange column 130, the sluicing preparation tank 140 may be refilled with either anion exchange resin 112 or cation exchange resin 116, depending on which of the anion exchange column 120 or the cation exchange column 130 will need to be replenished next.

In other embodiments, as depicted in FIGS. 3 and 4, the waste extraction system 100 comprises multiple sluicing preparation tanks, for example, the first sluicing preparation tank 140*a* fluidly coupled to the anion exchange column 120 by the anion exchange resin input pathway 142 and the second sluicing preparation tank 140*b* fluidly coupled to the cation exchange column 130 by the cation exchange resin input pathway 144. The first sluicing preparation tank 140*a* may be filled with fresh anion exchange resin 112 and the second sluicing preparation tank 140*b* may be filled with fresh cation exchange resin 116. In operation, fresh anion exchange resin 112 may be directed from the first sluicing preparation tank 140*a* into the anion exchange column 120 along the anion exchange resin input pathway 142, for example, using a sluice pump 182 and fresh cation exchange resin 116 may be directed from the second sluicing preparation tank 140*b* into the cation exchange column 130 along the cation exchange resin input pathway 144, for example, using a sluice pump 182.

Referring again to FIGS. 1-4, each sluicing preparation tank 140 comprises one or more loading openings 141 for loading fresh resins into the sluicing preparation tank 140 and for introducing pre-treatment acid, such as sulfuric acid, into the sluicing preparation tank 140. The pre-treatment acid comprises a pH that is similar to (e.g., within 1 unit of) the initial waste stream. For example, the pre-treatment acid may comprise sulfuric acid, which has a pH of 1. However, it should be understood that other acids may be used as pre-treatment acids. For example, the acid used to pre-treat anion exchange resin 112 may have a lower pH the acid used to pre-treat cation exchange resin 116. By lowering the pH, the anion exchange resin 112 and the cation exchange resin 116 is more well suited to adsorb radionuclides. Pretreating the anion exchange resin 112 and the cation exchange resin 116 forms a slurry which may reduce the difficulty of pumping each resin into the anion exchange column 120 and the cation exchange column 130, respectively. When the anion exchange resin 112 and the cation exchange resin 116 contact certain materials, such as an acid, water, or other resin media, the anion exchange resin 112 and the cation exchange resin 116 may swell in size. Thus, by pretreating the anion exchange resin 112 and the cation exchange resin 116, resin swelling can be accounted for when packing the anion exchange column 120 and the cation exchange column 130, ensuring that the anion exchange column 120 and the cation exchange column 130 can be packed in a reasonable and efficient manner. Moreover, pretreating the anion exchange resin 112 and the cation exchange resin 116 places the resins into the chemical form best suited for adsorbing radionuclides from the waste stream. For example, the anion exchange resin 112 may be placed into its chloride form (Cl−) during pretreatment and the cation exchange resin 116 may be placed into its sodium form (Na+) during pretreatment.

Referring still to FIGS. 1-4, the waste extraction system 100 further comprises a radiation shielding system 110 positioned between the sluicing preparation tank(s) 140 and both the anion exchange column 120 and the cation exchange column 130. In operation, the radiation shielding system 110 forms a radiation barrier between the sluicing preparation tank 140 and both the anion exchange column 120 and the cation exchange column 130. The radiation shielding system 110 may comprise lead, titanium, aluminum, concrete, or a combination thereof. It should be understood that the radiation shielding system 110 may comprise one or a combination of any known or yet to be developed radiation shielding material. Positioning the sluicing preparation tank(s) 140 behind the radiation shielding system 110 allows pre-treatment and loading of the anion exchange resin 112 and the cation exchange resin 116 to be performed at a location radiologically sheltered from the radionuclide containing waste stream. Thus, a radiological barrier may be positioned between personnel performing the loading and pre-treatment of fresh anion and cation exchange resins 112, 116 and the radionuclide containing waste stream. In some embodiments, the radiation shielding system 110 is a room or compartment that houses the sluicing preparation tank(s) 140 within the waste extraction system 100. In other embodiments, the radiation shielding system 110 is a room or compartment that houses components of the waste extraction system 100 into and through which radioactive waste flows, including the anion exchange column 120 and the cation exchange column 130.

Referring now to FIG. 5, a schematic, cross sectional view of the anion exchange column 120 and the cation exchange column 130 is depicted. As depicted in FIG. 5, in some embodiments, the anion exchange resin 112 comprises a plurality of anion exchange resin beads 114 and the cation exchange resin 116 comprises cation exchange resin beads 118. The anion exchange resin beads 114 and the cation exchange resin beads 118 comprise an average diameter in a range of from 200 μm to 1000 μm, for example, in a range of from 400 μm to 800 μm, such as 400 μm, 425 μm, 450 μm, 475 μm, 500 μm, 525 μm, 550 μm, 575 μm, 600 μm, 625 μm, 650 μm, 675 μm, 700 μm, 725 μm, 750 μm, 775 μm, 800 μm or any range having any two of these values as endpoints.

In some embodiments, the anion exchange resin 112 and the cation exchange resin 116 are each polymer based. The anion exchange resin 112 may comprise a weak base anion exchange resin or a strong base anion exchange resin. The cation exchange resin 116 may comprise a strong acid cation exchange resin. The anion exchange resin 112 and the cation exchange resin 116 have a combination of porosity, which contributes to the adsorption capacity, and chemical functionality, which contributes to selectivity. Moreover, the cation exchange resin 116 has a preference for adsorption of Cs-137 and Sr-90 compared to uranium and thus the cation exchange resin 116 is effective in the cation exchange column 130, while the anion exchange resin 112 has a preference for adsorption of uranium compared to Cs-137 and Sr-90 and thus the anion exchange resin 112 is effective in the anion exchange column 120. Example anion exchange resins 112 include Amberlite™ resin and DIAON™ resin. Example cation exchange resins 116 include SACMP (Strong Acid Cation Macroporous Polystyrene) resin (such as ResinTech® SACMP, manufactured by ResinTech Inc.) and AMP-PAN (Ammonium Molybophosphate Polyacrylonitrile) resin.

In some embodiments, the cation exchange resin 116 comprises an adsorption capacity of Cs-137 in a range of from 100 mg of Cs-137 per gram of the cation exchange resin 116 (i.e., 100 mg/g) to 200 mg/g, such as from 125 mg/g to 175 mg/g, for example, 105 mg/g, 110 mg/g, 115 mg/g, 120 mg/g, 125 mg/g, 130 mg/g, 135 mg/g, 140 mg/g, 145 mg/g, 150 mg/g, 153 mg/g, 155 mg/g, 157 mg/g, 160 mg/g, 165 mg/g, 170 mg/g, 175 mg/g, 180 mg/g, 185 mg/g, 190 mg/g, 195 mg/g, 200 mg/g, or a value in a range having any two of these numbers as endpoints. In some embodiments, the cation exchange resin 116 comprises an adsorption capacity of Sr-90 in a range of from 0.1 mg of Sr-90 per gram of the cation exchange resin 116 (i.e., 0.1 mg/g) to 1 mg/g, such as from 0.15 mg/g to 0.5 mg/g, for example 0.15 mg/g, 0.2 mg/g, 0.25 mg/g, 0.3 mg/g, 0.35 mg/g, 0.4 mg/g, 0.45 mg/g, 0.5 mg/g, 0.55 mg/g, 0.6 mg/g, 0.65 mg/g, 0.7 mg/g, 0.75 mg/g, 0.8 mg/g, 0.85 mg/g, 0.9 mg/g, 0.95 mg/g, 1 mg/g, or a value in a range having any two of these numbers as endpoints. Furthermore, in some embodiments, the anion exchange resin 112 comprises an adsorption capacity of uranium (e.g., U-235) in a range of from 85 mg of U per gram of the anion exchange resin 112 (i.e., 85 mg/g) to 165 mg/g, such as from 115 mg/g to 140 mg/g, for example, 85 mg/g, 90 mg/g, 95 mg/g, 100 mg/g, 105 mg/g, 110 mg/g, 115 mg/g, 120 mg/g, 125 mg/g, 130 mg/g, 135 mg/g, 140 mg/g, 145 mg/g, 150 mg/g, 155 mg/g, 160 mg/g, 165 mg/g, or a value in a range having any two of these numbers as endpoints.

Referring again to FIGS. 1-5, a method of radionuclide waste extraction using the waste extraction system 100 will now be described. First, the method comprises directing a waste stream from the upstream segment 162 of the main waste pathway 160 into the anion exchange column 120. Next, the method comprises adsorbing a primary radionuclide (e.g., uranium) from the waste stream onto the anion exchange resin 112 housed in the anion exchange column 120. In operation, the waste stream enters the anion exchange column 120 through the waste stream input 123, the anion exchange resin 112 housed in the anion exchange column 120 adsorbs the primary radionuclide present in the waste stream, removing the primary radionuclide from the waste stream. The waste stream then exits the anion exchange column 120 though the waste stream output 125 and flows to the cation exchange column 130 with lower levels of target radionuclide than was present in the waste stream upon entry into the anion exchange column 120. For example, the anion exchange resin 112 housed in the anion exchange column 120 adsorbs 85% or more of the target radionuclide present in the waste stream, for example, 86% or more, 87% or more, 88% or more, 89% or more, 90% or more, 91% or more, 92% or more, 93% or more, 94% or more, 95% or more, 96% or more, 97% or more, 98% or more, 99% or more, or a value in a range having any two of these numbers as endpoints.

Next, the method comprises directing the waste stream (e.g., the modified waste stream) from the anion exchange column 120 into the cation exchange column 130 for example, along an inter-column segment 165. In operation, the waste stream (e.g., the modified waste stream) enters the cation exchange column 130 through the waste stream input 134, and the cation exchange resin 116 housed in the cation exchange column 130 adsorbs target radionuclides, such as Sr-90 and Cs-137, present in the modified waste stream. In embodiments comprising more than one cation exchange column 130, the modified waste stream is next directed into an additional cation exchange column. In operation, the cation exchange resin 116 housed in the cation exchange column 130 (and any additional cation exchange columns) adsorbs 85% or more of the one or more target radionuclides initially present in the waste stream (e.g., present in the waste stream in the upstream segment 162 of the main waste pathway 160), for example, 85% or more of the strontium-90 and cesium-137 present in the modified waste stream, such as 90% or more, 92% or more, 94% or more, 95% or more, 96% or more, 97% or more, 98% or more, 99% or more, 99.5% or more, 99.9% or more, or a value in a range having any two of these numbers as endpoints.

The modified waste stream then exits the cation exchange column 130 though the waste stream output 135 into an inter-column segment 165 of the main waste pathway 160. After exiting the cation exchange column 130, the waste stream may be directed to either a second cation exchange column (e.g., in embodiments comprising two or more cation exchange columns) or the column effluent tank 150 (e.g., in embodiments comprising a single cation exchange column 130, as depicted in FIGS. 1-4). In embodiments comprising a second cation adsorption column, once the reduced modified waste stream enters the second cation exchange column, the method comprises adsorbing additional amounts of the one or more target radionuclides present in the modified waste stream onto the cation exchange resin housed in the second cation exchange column.

Referring still to FIGS. 1-5, the method further comprises removing the primary radionuclide from the anion exchange column 120 and directing the primary radionuclide along the strip waste pathway 170. This removal process may comprise directing an elution acid, such as sulfuric acid, into the anion exchange column 120 to desorb uranium from the anion exchange resin 112, forming a primary radionuclide waste stream. The elution acid may be directed from the elution acid source 175 along the elution pathway 172 and into the anion exchange column 120 through the elution input 124. One or more of the pumps 180 may be fluidly coupled to the elution pathway 172 to help facilitate flow of the elution acid in the elution pathway 172 and into the anion exchange column 120. During or after this first elution wash, the primary radionuclide waste stream may be directed from the anion exchange column 120 into the strip waste pathway 170, where it may be directed to the column effluent tank 150 (FIGS. 1 and 3) or a secondary collection tank 154 (FIGS. 2 and 4). In some embodiments, for example, in the embodiments of FIGS. 2 and 4, the primary radionuclide waste stream, which comprises the uranium desorbed from the anion exchange resin 112 may be recycled back into the medical radioisotope production process. For example, when the waste extraction system 100 is part of a medical isotope production facility, the uranium of the primary radionuclide waste stream may be used to generate additional medical isotopes and thereafter processed by the waste extraction system 100 as part of the waste stream.

After this first elution acid wash, the method next comprising resuming directing the waste stream from the upstream segment 162 of the main waste pathway 160 into the anion exchange column 120 and thereafter the cation exchange column 130 to adsorb additional primary radionuclide in the anion exchange column 120 and additional target radionuclide in the cation exchange column 130. Next a second elution acid wash may be performed to remove the adsorbed primary radionuclide from the anion exchange column 120 and the removed primary radionuclide may be directed to the column effluent tank 150 or the secondary collection tank 154. Additional rounds of adsorbing primary radionuclides in the anion exchange column 120 and target radionuclides the cation exchange column 130 followed by elution acid washes may be performed until the anion exchange resin 112 becomes spent resin. As used here, "spent resin" refers to ion exchange resin (e.g., anion exchange resin or cation exchange resin) that has an adsorption capacity at or below a threshold percentage of its initial adsorption capacity. Spent resin may comprise an adsorption capacity that is 90% or less of its initial adsorption capacity, for example, 85% or less, 80% or less, 75% or less, 70% or less, 65% or less, 60% or less, or a value in a range having any two of these numbers as endpoints. It should be understood that the threshold percentage for spent resin may change depending on the target radionuclides and the overall composition of the waste stream.

The method next comprises removing spent anion exchange resin from the anion exchange column 120 and directing fresh anion exchange resin from the sluicing preparation tank 140 (e.g., the sluicing preparation tank 140 of FIGS. 1 and 2 or the first sluicing preparation tank 140*a* of FIGS. 3 and 4) into the anion exchange column 120. Removing spent anion exchange resin from the anion exchange column 120 comprises ceasing flow of the waste stream from the upstream segment 162 of the main waste pathway 160 into the waste stream input 123 of the anion exchange column 120 and directing spent anion exchange resin from the anion exchange column 120 into the spent resin tank 156, for example, along the anion exchange resin output pathway 157. Next, fresh anion exchange resin may be directed from the sluicing preparation tank 140 into the anion exchange column 120 while flow of the waste stream from the upstream segment 162 of the main waste pathway 160 is ceased. After directing fresh anion exchange resin from the sluicing preparation tank 140 into the anion exchange column 120, flow of the waste stream from the upstream segment 162 of the main waste pathway 160 into the waste stream input 123 of the anion exchange column 120 may be resumed. In some embodiments, at least three elution acid washes may be performed prior to removing the spent anion exchange resin and directing fresh anion exchange resin from the sluicing preparation tank 140 into the anion exchange column 120.

In some embodiments, the method also comprises removing spent cation exchange resin from the cation exchange column 130 and directing fresh cation exchange resin from the sluicing preparation tank 140 (e.g., the sluicing preparation tank 140 of FIGS. 1 and 2 or the second sluicing preparation tank 140*b* of FIGS. 3 and 4) into the cation exchange column 130. Removing spent cation exchange resin from the cation exchange column 130 comprises ceasing flow of the waste stream into the waste stream input 134 of the cation exchange column 130 and directing spent cation exchange resin from the cation exchange column 130 into the spent resin tank 156, for example, along the cation exchange resin output pathway 159. Next, fresh cation exchange resin may be directed from the sluicing preparation tank 140 into the cation exchange column 130 while flow of the waste stream the waste stream input 134 of the cation exchange column 130 is ceased. After directing fresh cation exchange resin from the sluicing preparation tank 140 into the anion exchange column 120, flow of the waste stream into the waste stream input 134 of the cation exchange column 130 may be resumed. As the initial waste stream comprises a higher percentage of the primary radionuclide than the one or more target radionuclides, the anion exchange resin 112 of the anion exchange column 120 is replaced by sluicing more frequently than the cation exchange resin 116 of the cation exchange column 130, for example, 2 or more times more frequently, 3 or more times more frequently, 4 or more times more frequently, or the like. In some embodiments, the method further comprises directing the spent resin received by the spent resin tank 156 to the waste tank 152 along the resin waste pathway 190 for final treatment and removal off-site. As noted above, the final treatment of the spent resin may be solidification with concrete.

In the embodiments of FIGS. 1 and 3, at the column effluent tank 150, the modified waste stream from the cation exchange column 130 mixes with the primary radionuclide waste stream from the anion exchange column 120. In the embodiments of FIGS. 2 and 4, the column effluent tank 150 receives just the modified waste stream from the cation exchange column 130 as the primary radionuclide is directed to the secondary collection tank 154. In some embodiments, the method further comprises directing the waste received by the column effluent tank 150 (e.g., resultant waste) to the waste tank 152 along the waste tank segment 166 for final treatment and removal off-site. As noted above, the final treatment of the resultant waste may be solidified with concrete, to form solidified, final waste, which may be performed separate from or together with the solidification of spent resin. This densifies the resultant waste and this final waste comprises a lower level of curies per cubic meter than the resultant waste used to form the final waste. Moreover, the methods of radionuclide waste extraction using the waste extraction system 100 described herein, are effective at remove large portions of target radionuclides such that the final waste formed from the resultant waste retain low levels of radioactivity.

For example, the resultant waste may comprise less than 0.25 curies per cubic meter of Sr-90, for example, less than 0.2 curies per cubic meter, less than 0.15 curies per cubic meter, less than 0.1 curies per cubic meter, less than 0.08 curies per cubic meter, less than 0.06 curies per cubic meter, less than 0.05 curies per cubic meter, less than 0.04 curies per cubic meter, less than 0.03 curies per cubic meter, less than 0.02 curies per cubic meter, less than 0.01 curies per cubic meter, or any value in a range having any two of these values as endpoints. The resultant waste may also comprise less than 10 curies per cubic meter of Cs-137, for example, less than 8 curies per cubic meter, less than 6 curies per cubic meter, less than 5 curies per cubic meter, less than 4 curies per cubic meter, less than 2 curies per cubic meter, less than 1 curie per cubic meter, less than 0.75 curies per cubic meter, less than 0.5 curies per cubic meter, less than 0.25 curies per cubic meter, less than 0.1 curies per cubic meter, or any value in a range having any two of these values as endpoints. In some embodiments, the resultant waste comprises less than 0.04 curies per cubic meter of Sr-90 and less than 1 curie per cubic meter of Cs-137. In some embodiments, the final, densified waste comprises less than 0.04 curies per cubic meter of Sr-90 and less than 1 curie per cubic meter of Cs-137.

Moreover, the above values of curies per cubic meter in the resultant waste may be achieved using the waste extraction system 100 described herein in embodiments in which the initial waste stream (that is, the waste stream traversing the upstream segment 162 of the main waste pathway 160) comprises greater than 150 curies per cubic meter of Sr-90, for example, greater than 200 curies per cubic meter, greater than 300 curies per cubic meter, greater than 300 curies per cubic meter, greater than 300 curies per cubic meter, greater than 500 curies per cubic meter, greater than 1000 curies per cubic meter, greater than 2500 curies per cubic meter, greater than 5000 curies per cubic meter, or any value in a range having any two of these values as endpoints, and comprises greater than 44 curies per cubic meter of Cs-137, for example, greater than 50 curies per cubic meter, greater than 100 curies per cubic meter, greater than 250 curies per cubic meter, greater than 500 curies per cubic meter, greater than 800 curies per cubic meter, greater than 1000 curies per cubic meter, greater than 1500 curies per cubic meter, greater than 2000 curies per cubic meter, greater than 3500 curies per cubic meter, or any value in a range having any two of these values as endpoints.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, optical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of radionuclide waste extraction, the method comprising:

directing a waste stream from an upstream segment of a main waste pathway into a waste stream input of an anion exchange column, wherein:

the waste stream comprises uranium and one or more target radionuclides;

the anion exchange column houses an anion exchange resin;

a cation exchange column housing a cation exchange resin is fluidly coupled to the anion exchange column along the main waste pathway and positioned downstream the anion exchange column; and a sluicing preparation tank is fluidly coupled to the anion exchange column;

adsorbing uranium from the waste stream onto an anion exchange resin housed in the anion exchange column;

directing the waste stream from the anion exchange column into the cation exchange column;

adsorbing one or more target radionuclides onto a cation exchange resin housed in the cation exchange column;

removing spent anion exchange resin from the anion exchange column; and directing fresh anion exchange resin from the sluicing preparation tank into the anion exchange column.

2. The method of claim 1, wherein the one or more target radionuclides comprise strontium-90 and cesium-137.

3. The method of claim 1, wherein the anion exchange resin comprises an initial adsorption capacity and the spent anion exchange resin comprises an adsorption capacity of 85% or less of the initial adsorption capacity.

4. The method of claim 1, further comprising directing the waste stream from the cation exchange column to a column effluent tank, wherein the waste stream entering the column effluent tank comprises less than 0.04 curies per cubic meter of strontium-90 and less than 1 curie per cubic meter of cesium-137.

5. The method of claim 1, further comprising, prior to removing spent anion exchange resin:

directing elution acid into the anion exchange column to desorb uranium from the anion exchange resin in a first elution acid wash, forming a uranium waste stream; and after the first elution acid wash, directing the waste stream from the upstream segment of the main waste pathway into the anion exchange column and adsorbing uranium onto the anion exchange resin.

6. The method of claim 5, further comprising directing the uranium waste stream from the anion exchange column to a column effluent tank along a strip waste pathway, wherein the strip waste pathway extends from the anion exchange column to the column effluent tank bypassing the cation exchange column.

7. The method of claim 5, further comprising directing the uranium waste stream from the anion exchange column to a secondary collection tank along a strip pathway and directing the waste stream from the cation exchange column to a column effluent tank.

8. The method of claim 5, further comprising, after the first elution acid wash and prior to removing the spent anion exchange resin:

directing the elution acid into the anion exchange column to desorb uranium from the anion exchange resin in a second elution acid wash; and after the second elution acid wash, directing the waste stream from the upstream segment of the main waste pathway into the anion exchange column and adsorbing uranium onto the anion exchange resin.

9. The method of claim 5, further comprising, performing at least three elution acid washes prior to removing the spent anion exchange resin and directing fresh anion exchange resin from the sluicing preparation tank into the anion exchange column.

10. The method of claim 1, wherein removing spent anion exchange resin from the anion exchange column comprises:

ceasing flow of the waste stream from the upstream segment of the main waste pathway into the waste stream input of the anion exchange column; and directing spent anion exchange resin from the anion exchange column into a spent resin tank; and directing fresh anion exchange resin from the sluicing preparation tank into the anion exchange column occurs while flow of the waste stream from the upstream segment of the main waste pathway is ceased; and after directing fresh anion exchange resin from the sluicing preparation tank into the anion exchange column, the method further comprises resuming flow of the waste stream from the upstream segment of the main waste pathway into the waste stream input of the anion exchange column.

11. The method of claim 1, wherein the sluicing preparation tank is fluidly coupled to the cation exchange column and the method further comprises:

removing spent cation exchange resin from the cation exchange column; and directing fresh cation exchange resin from the sluicing preparation tank into the anion exchange column.

12. The method of claim 1, wherein the sluicing preparation tank is a first sluicing preparation tank, and the method further comprises;

removing spent cation exchange resin from the cation exchange column; and directing fresh cation exchange resin from a second sluicing preparation tank into the cation exchange column.

13. The method of claim 1, wherein:

the waste stream in the upstream segment of the main waste pathway comprises 1 gram/liter of uranium or greater; and the waste stream in the upstream segment of the main waste pathway comprises a gram/liter level of uranium that is at least 500 times greater than a gram/liter level of both strontium-90 and cesium-137.

* * * * *